(12) United States Patent
Robinson et al.

(10) Patent No.: US 8,207,274 B2
(45) Date of Patent: Jun. 26, 2012

(54) SOLVENT-FREE PROCESS FOR SYNTHESIS OF A CURABLE WAX

(75) Inventors: Sarah J. P. Robinson, Mississauga (CA); Thomas E. Enright, Tottenham (CA); Jennifer L. Belelie, Oakville (CA)

(73) Assignee: Xerox Corporation, Norwalk, CT (US)

( * ) Notice: Subject to any disclaimer, the term of this patent is extended or adjusted under 35 U.S.C. 154(b) by 85 days.

(21) Appl. No.: 12/756,250

(22) Filed: Apr. 8, 2010

(65) Prior Publication Data
US 2011/0251334 A1    Oct. 13, 2011

(51) Int. Cl.
C08F 20/10 (2006.01)
C08L 33/08 (2006.01)
(52) U.S. Cl. ............ 525/301; 525/50; 525/55; 525/242; 525/326.1
(58) Field of Classification Search ............... 525/50, 525/55, 242, 301, 326.1
See application file for complete search history.

(56) References Cited

U.S. PATENT DOCUMENTS

| 4,675,436 | A | * | 6/1987 | Dietrich et al. ............... 560/205 |
| 6,547,380 | B2 | | 4/2003 | Smith et al. |
| 7,559,639 | B2 | | 7/2009 | Belelie et al. |
| 2007/0120925 | A1 | * | 5/2007 | Belelie et al. ................. 347/100 |

OTHER PUBLICATIONS

How to Clean Laboratory Glassware, from http://chemistry.about.com/od/chemistrylabexperiments/a/cleanglassware.htm (Oct. 31, 2011).*
Chen, "Dimer Acids," Kirk-Othmer Encyclopedia of Chemical Technology, vol. 8, 4th Ed., pp. 223-237, 1992.

* cited by examiner

Primary Examiner — David W Wu
Assistant Examiner — Vu A Nguyen
(74) Attorney, Agent, or Firm — Oliff & Berridge, PLC

(57) ABSTRACT

The methods of manufacturing a curable wax, such as an acrylate of a hydroxyl-terminated polyethylene wax having the structure $CH_3-(CH_2)_n-CH_2OH$, where n=22-24, and removing a fouled material in a reactor are disclosed. The methods may include reacting a wax having a transformable functional group and a curable compound in the absence of an organic solvent to form an acrylate. The methods may further include removing excess curable compound using hot water having a temperature of more than about 85° C., solidifying the acrylate, removing the acrylate, and removing a fouled material in the reactor by emulsification.

14 Claims, No Drawings

SOLVENT-FREE PROCESS FOR SYNTHESIS OF A CURABLE WAX

RELATED APPLICATIONS

In co-pending application Ser. No. 11/289,615 (entitled "Radiation Curable Ink Containing a Curable Wax," Jennifer L. Belelie et al.), filed Nov. 30, 2005, described is a method of preparing a curable wax in the presence of toluene.

U.S. patent application Ser. No. 12/756,415, filed Apr. 8, 2010, the disclosure of which is hereby incorporated by reference in its entirety, describes a method of manufacturing a curable wax that comprises reacting a wax having a transformable functional group and a curable compound in the presence of an organic solvent to form an acrylate, removing excess compound that provides a curable group using hot water having a temperature of more than about 85° C., and solidifying the acrylate.

TECHNICAL FIELD

The present disclosure generally relates to methods of synthesizing curable wax for use in forming radiation curable inks, particularly for use in ink jet printing. The present disclosure specifically relates to methods of synthesizing a curable wax in a solvent-free process and removing fouled material from a reactor by using a surfactant and hot water.

BACKGROUND

The absence of an organic solvent when synthesizing a curable wax has the disadvantage of fouling the reactor upon completion of the solvent-free synthesis of curable wax. The fouling manifests itself as unstable and inhomogeneous production, with formation of gels and build up of polymer deposits on the inner surfaces of the reactor. The gels and polymer deposits, when released from the reactor surfaces, can contaminate the final wax and compromise its quality. Also, the unstable production due to fouling makes it difficult to produce a wax with a consistent and reproducible quality. As a result, a process of removing the fouled material following solvent-free synthesis of curable wax is desirable.

SUMMARY

In embodiments, described is a method of manufacturing a curable wax, the method comprising reacting in a reactor a wax having a transformable functional group and a curable compound in the absence of an organic solvent to form an acrylate, removing water and excess curable compound, solidifying the acrylate, removing the acrylate from the reactor, and removing a fouled material from the reactor by emulsification.

Also described is a method of manufacturing an acrylate of a hydroxyl-terminated polyethylene wax having the structure $CH_3$—$(CH_2)_n$—$CH_2OH$, where n=22-24, the method comprising reacting a hydroxyl-terminated polyethylene wax having the structure $CH_3$—$(CH_2)_n$—$CH_2OH$, where n=22-24, and acrylic acid in the absence of an organic solvent to form an acrylate, removing water and excess curable compound using hot water having a temperature of more than about 85° C., solidifying the acrylate using cold water having a temperature of less than about 10° C., removing the acrylate from the reactor, and removing a fouled material in the reactor by emulsification.

Further described is a method of manufacturing a radiation curable ink, the method comprising providing a curable monomer, providing a colorant, providing a curable wax, where the curable wax is synthesized in the absence of an organic solvent.

Still further described is a method of removing a fouled material after synthesizing a curable wax in the absence of an organic solvent, the method comprising emulsification using a surfactant and water, where the surfactant and water having a temperature of from about 85° C. to about 100° C. are charged to a reactor, the reactor is agitated while maintaining a reactor temperature of from about 85° C. to about 100° C., the surfactant and water solution is discharged, the above steps are repeated, and the reactor is rinsed with water to remove any surfactant residue.

DETAILED DESCRIPTION OF EMBODIMENTS

Described are methods of synthesizing a curable wax, such as an acrylate of a hydroxyl-terminated polyethylene wax having the structure $CH_3$—$(CH_2)_n$—$CH_2OH$, where n=22-24, in the absence of an organic solvent. Also described are methods of removing fouled material in a reactor by using a surfactant and hot water.

The process of synthesizing the curable wax involves a condensation reaction between a wax having a transformable functional group and a curable compound. For example, the process may involve reacting a wax having a transformable functional group and a curable compound in the presence of toluene sulphonic acid and hydroquinone, and in the absence of an organic solvent, in a heated environment to form an acrylate, cooling the acrylate, removing water and excess curable compound, and solidifying the acrylate.

Suitable examples of waxes include, but are not limited to, those that are functionalized with curable groups. The curable groups may include, but are not limited to, acrylate and methacrylate. These waxes can be synthesized by the reaction of a wax equipped with a transformable functional group, such as carboxylic acid or hydroxyl with a compound that provides the curable group.

Suitable examples of hydroxyl-terminated polyethylene waxes that may be functionalized with a curable group include, but are not limited to, mixtures of carbon chains with the structure $CH_3$—$(CH_2)_n$—$CH_2OH$, where there is a mixture of chain lengths, n, where the average chain length is, for example, in the range of about 16 to about 50, such as about 20 to about 30 or about 40, and linear low molecular weight polyethylene, of similar average chain length. Suitable examples of such waxes include, but are not limited to, UNILIN® 350, UNILIN® 425, and UNILIN® 550 with $M_n$ approximately equal to 375, 460, and 550 g/mol, respectively. All of these waxes are commercially available from Baker-Petrolite. Guerbet alcohols, characterized as 2,2-dialkyl-1-ethanols, are also suitable compounds. Suitable examples of Guerbet alcohols include those containing 16 to 36 carbons, many of which are commercially available from Jarchem Industries Inc., Newark, N.J. PRIPOL® 2033 (C-36 dimer diol mixture including isomers of the formula

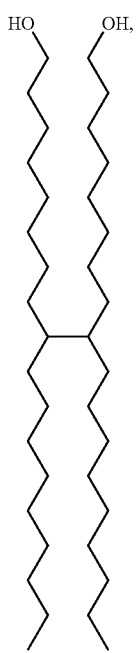

as well as other branched isomers which may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference) can also be used. These alcohols can be reacted with carboxylic acids equipped with UV curable moieties to form reactive esters. Examples of these acids include, but are not limited to, acrylic and methacrylic acids, available from Sigma-Aldrich Co. In embodiments, the reaction product in the form of curable monomers may be acrylates of UNILIN® 350, UNILIN® 425, and UNILIN® 550.

In embodiments, the process involves reacting a hydroxyl-terminated polyethylene wax, such as a hydroxyl-terminated polyethylene wax having the structure $CH_3—(CH_2)_n—CH_2OH$, where n=22-24, and an acrylic acid in the presence of toluene sulphonic acid and hydroquinone, and in the absence of an organic solvent, in a heated environment to form an acrylate, cooling the acrylate, removing water and excess acrylic acid, and solidifying the acrylate. The reaction is illustrated by the following formula:

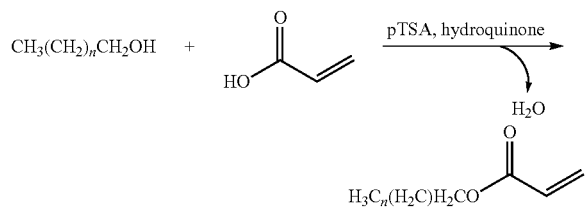

Unilin 350, n = 22-24

Compounds such as p-toluene sulfonic acid (as a catalyst) and hydroquinone (as a radical trap) may be added to the reaction. Other catalysts may include sulfuric acid, methyl sulfonic acid, ethyl sulfonic acid, propyl sulfonic acid, and hydrochloric acid. Other radical traps may include hydroquinone mono methyl ether, p-(naphthyl-1-methoxy)phenol, p-(naphthyl-2-methyoxy)phenol, 2-(naphthyl-1-methyl)hydroquinone, 2-(naphthyl-1-methyl)-1,4-benzoquinone, o-xylylene-bis-hydroquinone ether, m-xylylene-bis-hydroquinone ether, p-xylylene-bis-hydroquinone ether, hydroquinone(4-phenoxymethyl)benzyl ether, 2,5-bis (napththyl-1-methyl)hydroquinone, 1-(3,4-dihydroxybenzyl)naphthalene, 2,5-dibenzylhydroquinone, 4-benzyloxy-2-benzylphenol, 2,5-dibenzyl-1,4-benzoquinone, 3-(naphthyl-1-methyl)-1,2-benzoquinone, 2,6-di-t-butyl-4-(naphthyl-1-methoxy)phenol, phenothiazine, t-butylcatechol, p-benzoquinone, methylene blue, diphenylamine, and 4-hydroxy-2,2,6,6-tetramethylpiperidinooxyl.

The step of removing water and excess curable compound may involve at least one extraction process using hot water, the extraction process comprising removing the excess curable compound from a waxy phase into a water phase, and removing the water phase. In other embodiments, the extraction process may be repeated two, three or more times. In other embodiments, during the last extraction process, the water phase is not removed such that the water phase serves to preheat the discharge line to a vacuum filter for isolating the acrylate.

The hot water may have a temperature of more than about 85° C., such as from about 90 to about 100° C.

The acrylate may be solidified by adding the acrylate to cold water such that the acrylate becomes solid, isolating the solid acrylate by filtration, and drying the solid acrylate. The cold water may have a temperature of less than 10° C. This cooling method forms discrete particles. Another cooling method that may be used involves separating the final water phase to a pail and discharging the waxy (product) phase to trays, and allowing the material to cool slowly at room temperature. This method may then require physical breaking of the solid waxy "sheets." Filtration may be performed by any known filtration methods, including the use of a vacuum filter. Drying the solid acrylate may also be performed by any known drying method, including the use of a vacuum oven. Drying may be performed at a temperature of 70° C. or less, such as 60° C., but should not be carried out at more than 70° C. to avoid melting the product and/or fusing the product back together (negating the advantage to previously forming discrete particles).

Agitation of the reactor may be utilized to stir the solution during reaction and extraction. Any suitable stirring (agitation) device may be utilized. The stirring need not be at a constant speed, but may be varied. The stirring may be at from about 10 revolutions per minute (rpm) to about 300 rpm. In embodiments, the stirring may be from about 50 to about 250 rpm or from about 100 to about 150 rpm. In other embodiments, the stirring may be from about 10 to about 150 rpm or from about 200 to about 300 rpm.

As described above, following the synthesis of the curable wax in the absence of an organic solvent, fouling of the reactor occurs where gels and build up of polymer is deposited on the inner surfaces of the reactor. The fouled material may be removed by adding an amount of surfactant and an amount of hot water to the reactor, agitating the reactor while maintaining the heat in the reactor, discharging the solution, and repeating the process one, two, three, or more times as needed. The reactor may then be rinsed with clean water to remove any surfactant residue.

The weight ratio of surfactant and hot water in embodiments may be about 1:100. When implemented at 2 L scale, a suitable amount of surfactant may be from about 0.9 g to about 2.7 g, such as about 1.2 g to about 2.4 g, or from about 1.5 g to about 2.1 g. When implemented at 2 L scale, a suitable amount of the hot water may be from about 1.5 L to about 1.9 L, and a suitable temperature for the hot water may be from about 85° C. to about 100° C., such as about 95° C. These figures may be scaled up accordingly when the process is implemented at larger scale.

In embodiments, the process may include one, two, or more surfactants. The surfactants may be selected from ionic surfactants and nonionic surfactants. Anionic surfactants and cationic surfactants are encompassed by the term "ionic surfactants." In embodiments, the surfactant may be added as an aqueous solution with a concentration from about 5% to about 100% (pure surfactant) by weight. In embodiments, the concentration may be from about 20% to about 80%, or from about 40% to about 60%. In other embodiments, the concentration may be from about 5% to about 30% or from about 70% to about 100%. The surfactant(s) may be directly added in solid form or may be dissolved in solution and added.

Examples of nonionic surfactants that can be utilized for the processes illustrated herein are, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R, NEOGEN SC obtained from Daiichi Kogyo Seiyaku, combinations thereof, and the like. Other suitable anionic surfactants include, in embodiments, DOWFAX 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL and ALKAQUAT, available from Alkaril Chemical Company, SANIZOL (benzalkonium chloride), available from Kao Chemicals, and the like, and mixtures thereof.

Similar to the description above, agitation of the reactor may be utilized to stir the surfactant and hot water solution.

As noted above, the curable wax formed by the present method may be used in forming radiation curable ink. An exemplary composition of radiation curable inks is described in co-pending application Ser. No. 11/289,615, the entire disclosure of which is incorporated herein by reference.

As described in co-pending application Ser. No. 11/289,615, the radiation curable ink in embodiments comprises a curable monomer that is liquid at about 25° C., a curable wax, and a colorant. In embodiments, the curable monomer has a viscosity of no more than about 20 mPa-s, in other embodiments no more than about 18 mPa-s, and yet in other embodiments no more than about 16 mPa-s at 25° C.

In embodiments, the ink has a viscosity of from about 8 mPa-s to about 15 mea-s, in other embodiments from about 10 mPa-s to about 12 mPa-s, at a temperature between about 60° C. and about 100° C. In embodiments, the ink has a viscosity of from about $10^5$ to about $10^7$ mPa-s at a temperature of about 50° C. or below, specifically at a temperature from about 0° C. to about 50° C.

The curable monomer may be any curable monomer that is a liquid at about 25° C. In embodiments, the monomer is equipped with one or more curable moieties, including, but not limited to, acrylates; methacrylates; alkenes; allylic ethers; vinyl ethers; epoxides, such as cycloaliphatic epoxides, aliphatic epoxides, and glycidyl epoxides; oxetanes; and the like. The monomers are, for example, monoacrylates, diacrylates, or polyfunctional alkoxylated or polyalkoxylated acrylic monomers comprising one or more di- or tri-acrylates.

Suitable monoacrylates are, for example, cyclohexyl acrylate, 2-ethoxy ethyl acrylate, 2-methoxy ethyl acrylate, 2(2-ethoxyethoxy)ethyl acrylate, tetrahydrofurfuryl acrylate, octyl acrylate, lauryl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, octyl decyl acrylate, ethoxylated nonylphenol acrylate, hydroxyethyl acrylate, hydroxyethyl methacrylate, and the like. Suitable polyfunctional alkoxylated or polyalkoxylated acrylates are, for example, alkoxylated, in embodiments, ethoxylated, or propoxylated, variants of the following: neopentyl glycol diacrylates, butanediol diacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, propoxylated neopentyl glycol diacrylate, ethoxylated neopentyl glycol diacrylate, and the like. In embodiments, the monomer is a propoxylated neopentyl glycol diacrylate, such as, for example, SR-9003 (Sartomer Co., Inc., Exton, Pa.), having the structure:

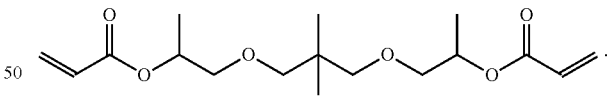

Suitable reactive monomers are likewise commercially available from, for example, Sartomer Co., Inc., Henkel Corp., Radcure Specialties, and the like.

In embodiments, the curable monomer is included in the ink in an amount of from, for example, about 20 to about 80% by weight of the ink, specifically from about 30 to about 70% by weight of the ink, and more specifically from about 35 to about 60% by weight of the ink.

In other embodiments, the curable wax is included in the ink in an amount of from, for example, about 15 to about 70% by weight of the ink, specifically from about 20 to about 60% by weight of the ink, and more specifically from about 25 to about 50% by weight of the ink.

The curable monomer and curable wax together, for example, form more than about 50% by weight of the ink, specifically at least about 70% by weight of the ink, and more specifically at least about 80% by weight of the ink. The weight ratio of curable monomer to curable wax may be, for example, from about 0.7:1 to about 3:1, specifically from about 0.75:1 to about 2.5:1.

Any desired or effective colorant can be employed in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include, but are not limited to, Eastman olefin, Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. In embodiments, solvent dyes are used; within the class of solvent dyes, spirit soluble dyes may be used because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) may also be used.

Pigments are also suitable colorants for the inks. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); Sunfase Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2001 (Clariant); IRGALUE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™. (Cabot), Carbon Black 5250, Carbon Black 5750 (Columbia Chemical), mixtures thereof and the like.

In embodiments, the colorant is included in the ink in an amount of from, for example, about 0.1 to about 15% by weight of the ink, specifically from about 0.5 to about 6% by weight of the ink.

Radiation curable as used herein is intended to cover all forms of curing upon exposure to a radiation source, including light and heat sources and including in the presence or absence of initiators. Example radiation curing routes include, but are not limited to, curing using ultraviolet (UV) light, for example having a wavelength of 200-400 nm or more rarely visible light, for example in the presence of photoinitiators and/or sensitizers, curing using e-beam radiation, for example in the absence of photoinitiators, curing using thermal curing, in the presence or absence of high temperature thermal initiators (and which may be largely inactive at the jetting temperature), and appropriate combinations thereof.

In embodiments, the composition further comprises an initiator, such as a photoinitiator, that initiates polymerization of curable components of the ink, including the curable monomer and the curable wax. The initiator should be soluble in the composition. In other embodiments, the initiator is a UV-activated photoinitiator.

In embodiments, the initiator is a radical initiator. Examples of suitable radical photoinitiators include, but are not limited to, ketones such as benzyl ketones, monomeric hydroxyl ketones, polymeric hydroxyl ketones, and α-amino ketones; acyl phosphine oxides, metallocenes, benzophenones, such as 2,4,6-trimethylbenzophenone and 4-methylbenzophenone; and thioxanthenones, such as 2-isopropyl-9H-thioxanthen-9-one. A suitable ketone is 1-[4-(2-hydroxyethoxy)-phenyl]-2-hydroxy-2-methyl-1-propane-1-one. In embodiments, the ink contains an α-amino ketone, 1-[4-(2-hydroxyethoxy)-phenyl]-2-hydroxy-2-methyl-1-propane-1-one and 2-isopropyl-9H-thioxanthen-9-one.

In other embodiments, the initiator is a cationic initiator. Examples of suitable cationic photoinitiators include, but are not limited to, aryldiazonium salts, diaryliodonium salts, triarylsulfonium salts, triarylselenonium salts, dialkylphenacylsulfonium salts, triarylsulphoxonium salts and aryloxydiarylsulfonium salts.

The total amount of initiator included in the ink may be from, for example, about 0.5 to about 15%, specifically from about 1 to about 10%, by weight of the ink.

In embodiments, the ink further comprises a curable oligomer. Suitable curable oligomers include, but are not limited to, acrylated polyesters, acrylated polyethers, acrylated epoxies, urethane acrylates, and pentaerythritol tetraacrylate. Specific examples of suitable acrylated oligomers include, but are not limited to, acrylated polyester oligomers, such as CN2262 (Sartomer Co.), EB 812 (UCB Chemicals), CN2200 (Sartomer Co.), CN2300 (Sartomer Co.), and the like, acrylated urethane oligomers, such as EB270 (UCB Chemicals), EB 5129 (UCB Chemicals), CN2920 (Sartomer Co.), CN3211 (Sartomer Co.), and the like, acrylated epoxy oligomers, such as EB 600 (UCB Chemicals), EB 3411 (UCB Chemicals), CN2204 (Sartomer Co.), CN110 (Sartomer Co.), and the like; and pentaerythritol tetraacrylate oligomers, such as SR399LV (Sartomer Co.) and the like.

The total amount of curable oligomer included in the ink may be from, for example, about 0.5 to about 15%, specifically from about 1 to about 10%, by weight of the ink.

The ink may contain optional additives. Optional additives include, but are not limited to, surfactants, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, fungicides, bactericides, organic and/or inorganic filler particles, leveling agents, e.g., agents that create or reduce different gloss levels, opacifiers, antistatic agents, dispersants, and the like. In particular, the composition may include, as a stabilizer, a radical scavenger, such as Irgastab UV 10 (Ciba Specialty Chemicals, Inc.). The composition may also include an inhibitor, such as a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

The total amount of other additives included in the ink may be from, for example, about 0.5 to about 15%, specifically from about 1 to about 10%, by weight of the ink.

The inks described herein may be applied to a substrate to form an image. In embodiments, the method comprises providing a radiation curable ink described herein at a first temperature; applying the radiation curable ink to the substrate to form an image, the substrate being at a second temperature, which is below the first temperature; and exposing the radiation curable ink to radiation to cure the ink. During the curing process, the curable monomer and the curable wax, optionally with other curable components, such as the optional curable oligomer, are polymerized to form a cured image.

In embodiments, the composition is applied over the image by ink jet printing. The inks described herein may be jetted at temperatures of about 50° C. to about 110° C., specifically about 60° C. to about 100° C. The jetting temperature must be within the range of thermal stability of the composition, to prevent premature polymerization in the print head. At jetting, the inks in embodiments have a viscosity of from about 8 mPa-s to about 15 mPa-s, specifically about 10 mPa-s to about 12 mPa-s. The inks are thus ideally suited for use in piezoelectric ink jet devices.

However, the substrate to which they are applied could be at a temperature at which the ink has a higher viscosity, such as a viscosity of from about $10^5$ to about $10^7$ mPa-s. For example, the substrate may be maintained at a temperature of about 50° C. or below, specifically from about 0° C. to about 50° C., the temperature at the substrate being less than the jetting temperature. In embodiments, the substrate temperature is at least about 10° C. below the first temperature. In other embodiments, the substrate temperature is from about 10 to about 50° C. below the jetting temperature.

By jetting the ink at a temperature at which the ink is a liquid and having the substrate at the temperature at which the ink has a higher viscosity, a phase change can be provided. This phase change may prevent the composition from rapidly soaking into the substrate, avoiding or at least minimizing showthrough. In addition, the substrate is exposed to radiation to initiate polymerization of the curable monomer and curable wax, leading to a robust image.

The inks can be employed in apparatus for direct printing ink jet processes, where when droplets of the melted ink are ejected in an imagewise pattern onto a recording substrate, the recording substrate is a final recording substrate. Alternatively, the inks can be employed in indirect (offset) printing ink jet applications, where when droplets of the melted ink are ejected in an imagewise pattern onto a recording substrate, the recording substrate is an intermediate transfer member and the ink in the imagewise pattern is subsequently transferred from the intermediate transfer member to a final recording substrate. In both cases, the image on the substrate is exposed to UV light to initiate polymerization of the curable monomer and curable wax to form a robust image.

The substrate may be any suitable material such as paper, boxboard, cardboard, fabric, a transparency, plastic, glass, wood etc., although the ink may be used in forming images on paper. Following printing directly to or transfer to the substrate, the image on the substrate is exposed to radiation having an appropriate wavelength, mainly the wavelength at which the ink initiator absorbs radiation, to initiate the curing reaction of the ink. The radiation exposure need not be long, and may be for, e.g., about 0.05 to about 10 seconds, specifically from about 0.2 to about 5 seconds. These exposure times are more often expressed as substrate speeds of the ink passing under a UV lamp. For example, the microwave energized, doped mercury bulbs available from UV Fusion (Gaithersburg, Md.) are placed in an elliptical mirror assembly that is 10 cm wide; multiple units may be placed in series. Thus, a belt speed of 0.1 ms$^{-1}$ would require 1 second for a point of an image to pass under a single unit, while a belt speed 4.0 ms$^{-1}$ would require 0.2 s to pass under four bulb assemblies. The radiation to cure the polymerizable components of the ink may be provided by a variety of possible techniques, including but not limited to a xenon lamp, laser light, D or H bulb, etc. The curing light may be filtered, if desired or necessary. The curable components of the ink react to form a cured or crosslinked network of appropriate hardness. In embodiments, the curing is substantially complete, i.e., at least about 75% of the curable components are cured (polymerized and/or crosslinked), to allow the ink to be substantially hardened, and thereby to be much more scratch resistant, and also to adequately control the amount of showthrough on the substrate.

The present disclosure is also directed to a printer containing the inks described herein. Specifically, the present disclosure relates to a printer cartridge containing the inks described herein, as well as to a printer containing the printer cartridge.

In embodiments, the curable wax formed from the present disclosure may be used in ink jetting devices. Ink jetting devices are known in the art, and thus extensive description of such devices is not required herein. As described in U.S. Pat. No. 6,547,380, incorporated herein by reference, ink jet printing systems generally are of two types: continuous stream and drop-on-demand.

In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a substrate. In drop-on-demand systems, a droplet is expelled from an orifice directly to a position on a substrate in accordance with digital data signals. A droplet is not formed or expelled unless it is to be placed on the substrate.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

Examples are set forth hereinbelow and are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

Example 1

Synthesis of UNILIN 350 Acrylate at 2 L Scale 400 g of Unilin 350, 0.5 g of hydroquinone, and 3.96 g of p-toluene sulfonic acid were charged to a 2 L Buchi. The reactor was heated to a jacket temperature of 120° C. Agitation was begun at 400 RPM once the reactor contents have melted. 98.1 g of Acrylic Acid was added and the jacket temperature was then ramped from 120° C. to 145° C. over 120 minutes. During this time, reaction condensate (water) was cooled and collected by a condenser "03-46". Approximately 20 g of water was collected.

Once the Buchi reactor jacket reached the maximum temperature of 145° C., cooling was begun to bring the reactor to a batch temperature of 95° C. 200 g of de-ionized water ("DIW") was brought to boil in a separate vessel then charged to the reactor (temperature of water by the time of transfer was greater than 90° C.). Mixing was continued for 5 minutes and was then shut down and the water and waxy acrylate phases were allowed to separate (approx. 10 min). The bottom (water) phase was then discharged to a beaker from the bottom valve. The extraction procedure was repeated twice more with 200 g of hot DIW, separated and the water discharged to a beaker.

After the final separation the purified UNILIN 350 acrylate was discharged to a 4 L stainless steel beaker with overhead agitation charged with 2.5 L of cold DIW. The U350 Acrylate solidified as it contacted the DIW into yellowish white particles. The material was then isolated by filtration, and dried at 60° C. under full vacuum. The yield from the batch was approximately 400 g.

Example 2

Removal of Fouled Material from Reactor 1.8 g of Tayca surfactant and 1.8 L hot (greater than 95° C.) DIW were charged to the Buchi reactor. The reactor was agitated at 600 RPM for 15 minutes with heating to the reactor jacket maintained at 95° C. The solution was then discharged hot, and the process was repeated two or more times. The reactor was then rinsed with clean DIW to remove any surfactant residue.

What is claimed is:

1. A method of manufacturing a curable wax, the method comprising:
reacting in a reactor a wax having a transformable functional group and a curable compound in the absence of an organic solvent to form a curable wax,
removing water and excess curable compound,
solidifying the curable wax,
removing the curable wax from the reactor, and
removing a fouled material from the reactor by emulsification,
wherein:
the transformable functional group is a carboxylic acid or a hydroxyl group, and
the emulsification involves a surfactant and water having a temperature of from about 85° C. to about 100° C.

2. The method of claim 1, wherein the surfactant is a surfactant selected from the group consisting of ionic surfactants and nonionic surfactants.

3. The method of claim 1, wherein the surfactant is a branched sodium dodecyl benzene sulfonate.

4. The method of claim 1, further comprising rinsing the reactor with water after the emulsification to remove a residue of the surfactant.

5. The method of claim 1, wherein the water has a temperature of from about 90° C. to about 100° C.

6. The method of claim 1, wherein the wax having a transformable functional group is a hydroxyl-terminated polyethylene wax.

7. The method of claim 1, wherein the wax having a transformable functional group is a hydroxyl-terminated polyethylene wax having the structure $CH_3-(CH_2)_n-CH_2OH$, wherein n=22-24.

8. The method of claim 1, wherein the curable compound comprises a curable group selected from the group consisting of acrylate and methacrylate.

9. The method of claim 1, wherein the curable compound is an acrylic acid.

10. The method of claim 1, wherein the wax having a transformable functional group is a hydroxyl-terminated polyethylene wax having the structure $CH_3-(CH_2)_n-CH_2OH$, wherein n=22-24, and the curable compound is an acrylic acid.

11. The method of claim 1, wherein removing water and excess curable compound is performed by at least one extraction process using hot water, the extraction process comprising:
 removing the excess curable compound from a waxy phase into a water phase, and
 removing the water phase.

12. The method of claim 11, wherein the extraction process is performed at least 3 times.

13. The method of claim 12, wherein the water phase is not removed during a last extraction process.

14. The method of claim 1, wherein solidifying the acrylate is performed by adding cooled water to the acrylate such that the acrylate becomes solid, isolating the solid acrylate by filtration, and drying the solid acrylate.

\* \* \* \* \*